(12) United States Patent
Choi et al.

(10) Patent No.: US 9,937,827 B1
(45) Date of Patent: Apr. 10, 2018

(54) SLIDING ARMREST FOR VEHICLE

(71) Applicants: Bong Joo Choi, Chungcheongnam-Do (KR); Sang Wook Kang, Chungcheongnam-Do (KR)

(72) Inventors: Bong Joo Choi, Chungcheongnam-Do (KR); Sang Wook Kang, Chungcheongnam-Do (KR)

(73) Assignee: Seoyon E-Hwa Co., Ltd. (KR)

( * ) Notice: Subject to any disclaimer, the term of this patent is extended or adjusted under 35 U.S.C. 154(b) by 0 days.

(21) Appl. No.: 15/461,612

(22) Filed: Mar. 17, 2017

(30) Foreign Application Priority Data

Oct. 12, 2016 (KR) .................. 10-2016-0132187

(51) Int. Cl.
*B60N 2/46* (2006.01)
*B60N 2/44* (2006.01)

(52) U.S. Cl.
CPC .......... *B60N 2/4646* (2013.01); *B60N 2/442* (2013.01); *B60N 2/4686* (2013.01)

(58) Field of Classification Search
CPC .... B60N 2/4646; B60N 2/442; B60N 2/4686; B60N 2/646; B60N 2/7035; B29C 44/06
USPC .............................. 297/411.35, 411.2, 188.14
See application file for complete search history.

(56) References Cited

U.S. PATENT DOCUMENTS

| | | | | |
|---|---|---|---|---|
| 6,007,155 A * | 12/1999 | Hara | ............... | B60N 2/4646 248/118.5 |
| 6,719,367 B2 * | 4/2004 | Mic | ............... | B60N 2/4646 296/37.8 |
| 8,162,369 B2 * | 4/2012 | Tsuda | ............... | B60N 2/4646 296/24.34 |
| 9,022,466 B2 * | 5/2015 | Cinco | ............... | B60N 2/4646 297/188.14 |
| 2016/0001684 A1 * | 1/2016 | An | ............... | B60N 2/4646 296/37.5 |
| 2016/0003275 A1 | 1/2016 | An et al. | | |
| 2017/0057387 A1 | 3/2017 | Jang et al. | | |

FOREIGN PATENT DOCUMENTS

KR      10-1163450 B1   2/2012
KR       101500271 B1   3/2015

OTHER PUBLICATIONS

Extended European Search Report for Corresponding European application No. 17161185.8-1754, dated Oct. 10, 2017.

* cited by examiner

*Primary Examiner* — Milton Nelson, Jr.
(74) *Attorney, Agent, or Firm* — Tarolli, Sundheim, Covell & Tummino LLP

(57) ABSTRACT

A sliding armrest for a vehicle is provided that includes a lower cover having a rotatable hook that is detachably coupled to a console and opening and closing a storage space of the console An upper cover slides between a protruding position in a length direction and an initial position and a moving part is rotatably provided at the upper cover that rotates the hook at the initial position of the upper cover to detach the hook from the console. A stopper fastens to the lower cover to restrain sliding of the upper cover or released from the lower cover by the moving part to allow the sliding of the upper cover An interlock is disposed at the upper cover and that rotates the hook corresponding to an operation of the moving part at the protruding position of the upper cover, to detach the hook from the console.

8 Claims, 3 Drawing Sheets

I - I' though the armrest is slid by external force, it may be easily slid even when a user does not want to slide the armrest, therefore it may cause inconvenience to the user and hinder safe driving.

SLIDING ARMREST FOR VEHICLE

CROSS-REFERENCE TO RELATED APPLICATION(S)

This application claims priority to Korean Patent Application No(s). 10-2016-0132187, filed on Oct. 12, 2016, the disclosure of which is incorporated herein by reference in its entirety.

BACKGROUND OF THE INVENTION

Field of the Invention

Exemplary embodiments of the present invention relate to a sliding armrest for a vehicle, and more particularly, to a sliding armrest for a vehicle capable of being selectively slid by including a stopper operated corresponding to an operation of a knob.

Description of the Related Art

Generally, a console with a storage space for storing relatively small-sized articles is provided between a driver's seat and a passenger seat of a vehicle, and an armrest opening and closing the storage space and serving as a support on which a passenger may put his/her arm is installed on the console.

In this case, it is a general trend that the armrest has a structure in which it is slidable forward and backward according to a physical condition of the passenger.

In this regard, a prior art that relates to a sliding armrest for a vehicle has been disclosed in Korean Patent Publication No. 10-1163450B1 (Patent Document 1).

Patent Document 1 which relates to a sliding armrest for a vehicle, discloses a technology for enhancing operability for sliding by the sliding armrest for a vehicle including: an armrest lower cover opening and closing a storage part of a console box, a sliding rail installed in an upper part of the armrest lower cover and including a locking plate, a sliding guide slidably-movably joined to the sliding rail and including an elastic member elastically pressurizing the locking plate, and an armrest upper cover having the sliding guide installed in a lower part thereof to move forward and backward on the armrest lower cover.

However, since the armrest of Patent Document 1 is easily slid by external force, it may be easily slid even when a user does not want to slide the armrest, therefore it may cause inconvenience to the user and hinder safe driving.

PRIOR ART DOCUMENT

[Patent Document]
(Patent Document 1) Korean Patent Publication No. 10-1163450B1

SUMMARY OF THE INVENTION

An object of the present invention is to provide a sliding armrest for a vehicle capable of being selectively slid by including a stopper operated corresponding to an operation of a knob.

Another object of the present invention is to provide a sliding armrest for a vehicle capable of opening a console by operating a knob in a state in which the armrest is slid.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a sliding armrest for a vehicle includes a lower cover having a rotatable hook that is detachably coupled to a console and opening and closing a storage space of the console; an upper cover disposed above the lower cover and slid between a protruding position in a length direction and an initial position; a knob means rotatably provided at the upper cover and rotating the hook at the initial position of the upper cover to detach the hook from the console; a stopper disposed at the upper cover, and fastened to the lower cover to restrain sliding of the upper cover or released from the lower cover by the knob means to allow the sliding of the upper cover; and an interlock disposed at the upper cover and rotating the hook corresponding to an operation of the knob means at the protruding position of the upper cover, to detach the hook from the console.

The knob means may include a rotating shaft rotatably fastened to the upper cover, a knob protruding from one side of the rotating shaft toward outside of the upper cover and operated by a user, and a moving part protruding from the other side of the rotating shaft to be disposed at an inner side of the upper cover and having an end rotatably fastened to the stopper and a protrusion protruding downward and operating the hook.

The knob means may further include an elastic member disposed at the rotating shaft and having one end fastened to the moving part and the other end fastened to the upper cover to apply elastic force so that the knob rotates downward.

The stopper may include a rotating shaft rotatably fastened to the upper cover, a first link protruding from one side of the rotating shaft to be rotatably fastened to the knob means, and a second link protruding from the other side of the rotating shaft and having an end bent to be selectively inserted into a hole formed in the lower cover.

The first link of the stopper may rotate by an operation of the knob means, and when the first link rotates downward, the end of the second link may rotate upward to be separated from the hole of the lower cover.

The interlock may include a rotating shaft rotatably fastened to the upper cover to be positioned above the stopper, a first member protruding from one side of the rotating shaft to contact a second link of the stopper, and a second member protruding from the other side of the rotating shaft and having an end bent to be inserted into a through hole formed in the second link of the stopper to selectively rotate the hook.

In the interlock, when the second link of the stopper rotates upward, the first member may rotate upward together therewith and the second member may rotate downward so that the end of the second member rotates the hook to detach the hook from the console.

The lower cover may include a first hole into which the end of the second link of the stopper is inserted at the initial position of the upper cover, and a second hole into which the end of the second link of the stopper is inserted at the protruding position of the upper cover.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
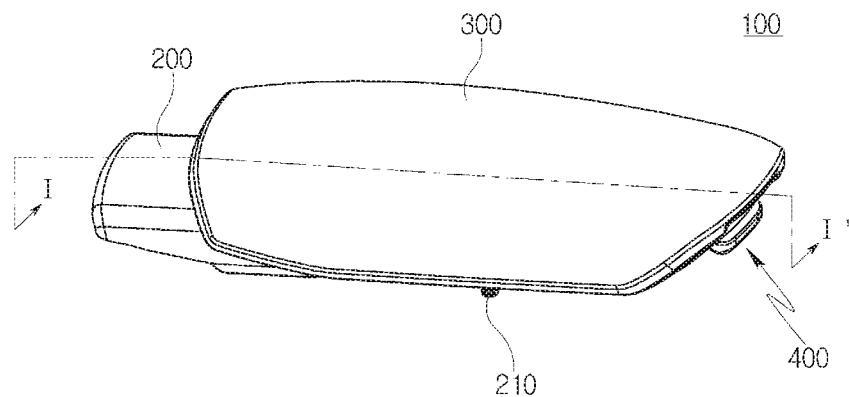
FIG. 1 is a perspective view schematically illustrating a sliding armrest for a vehicle according to an exemplary embodiment of the present invention.

Hereinafter, a sliding armrest for a vehicle according to an exemplary embodiment of the present invention will be described in more detail in order to assist in understanding of the features of the present invention.

It is to be noted that in adding reference numerals to elements of each accompanying drawing, like reference numerals refer to like elements even though like elements are shown in different drawings. Further, in describing exemplary embodiments of the present invention, when it is determined that detailed description of known functions or configuration may obscure the gist of the present invention, the detailed description will be omitted.

Hereinafter, exemplary embodiments of the present invention will be described in detail with reference to the accompanying drawings.

Figure 2:
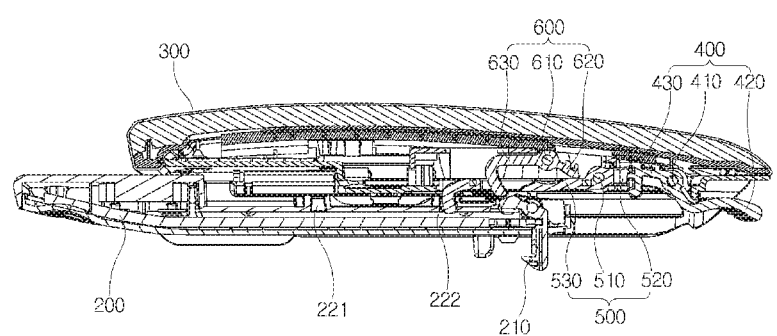
FIG. 2 is a cross-sectional view schematically illustrating a state in which an upper cover is slid to protrude in the sliding armrest for a vehicle according to an exemplary embodiment of the present invention.

FIG. 1 is a perspective view schematically illustrating a sliding armrest for a vehicle according to an exemplary embodiment of the present invention and FIG. 2 is a cross-sectional view schematically illustrating a state in which an upper cover is slid to protrude in the sliding armrest for a vehicle.

Figure 3:
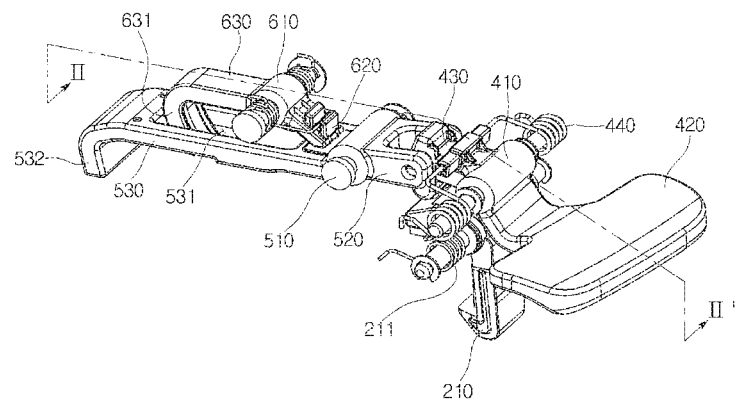
FIG. 3 is a perspective view schematically illustrating a hook, a knob means, a stopper, and an interlock of the sliding armrest for a vehicle according to an exemplary embodiment of the present invention.
Figure 4:
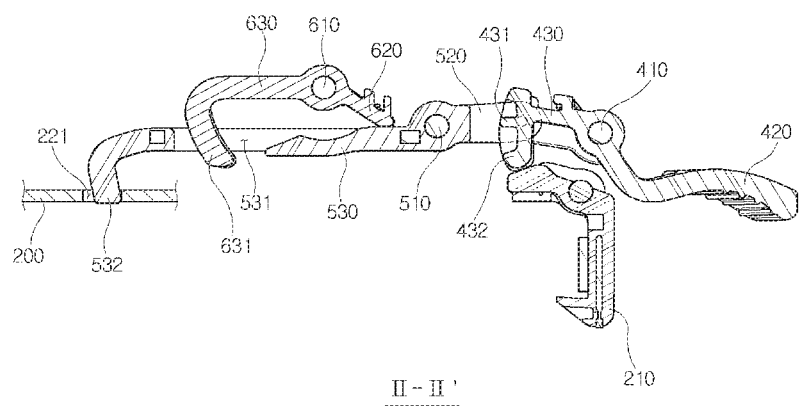
FIG. 4 is a cross-sectional view schematically illustrating the hook, the knob means, the stopper, and the interlock of the sliding armrest for a vehicle according to an exemplary embodiment of the present invention.

Further, FIG. 3 is a perspective view schematically illustrating a hook, a knob means, a stopper, and an interlock of the sliding armrest for a vehicle and FIG. 4 is a cross-sectional view schematically illustrating the hook, the knob means, the stopper, and the interlock of the sliding armrest for a vehicle.

Figure 5:
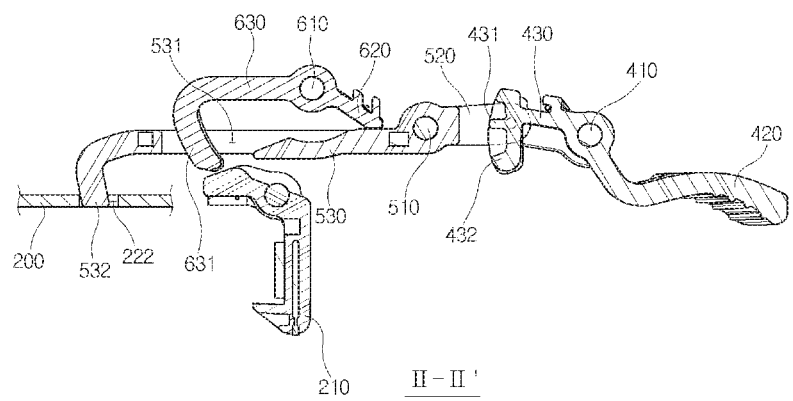
FIG. 5 is a cross-sectional view schematically illustrating a disposition state of the hook, the knob means, the stopper, and the interlock in the state in which the upper cover of the sliding armrest for a vehicle according to an exemplary embodiment of the present invention is slid to protrude.
Figure 6:
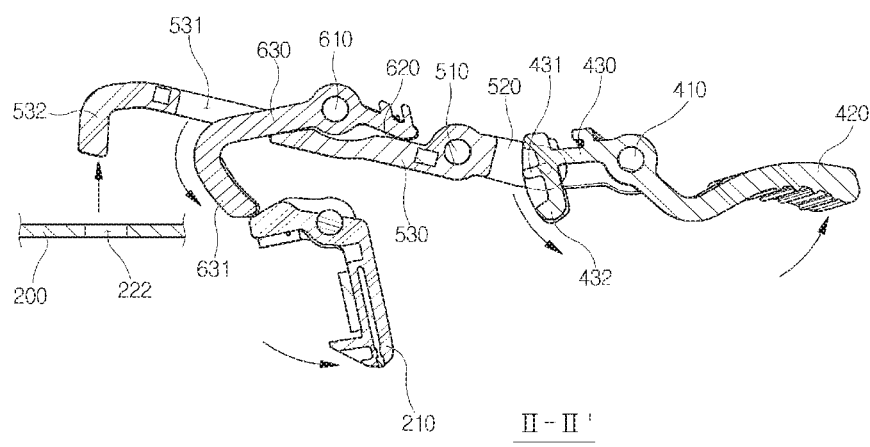
FIG. 6 is a cross-sectional view schematically illustrating an operation state of the hook, the knob means, the stopper, and the interlock in the state in which the upper cover of the sliding armrest for a vehicle according to an exemplary embodiment of the present invention is slid to protrude.

Further, FIG. 5 is a cross-sectional view schematically illustrating a disposition state of the hook, the knob means, the stopper, and the interlock in the state in which the upper cover of the sliding armrest for a vehicle is slid to protrude and FIG. 6 is a cross-sectional view schematically illustrating an operation state of the hook, the knob means, the stopper, and the interlock in the state in which the upper cover of the sliding armrest for a vehicle is slid to protrude.

Referring to FIGS. 1 to 6, the sliding armrest 100 for a vehicle includes a lower cover 200 having a rotatable hook 210 that is detachably coupled to a console and opening and closing a storage space of the console, an upper cover 300 disposed above the lower cover 200 and slid between a protruding position in a length direction and an initial position, a knob means 400 rotatably provided at the upper cover 300 and rotating the hook 210 at the initial position of the upper cover 300 to detach the hook 210 from the console, a stopper 500 disposed at the upper cover 300, and fastened to the lower cover 200 to restrain sliding of the upper cover 300 or released from the lower cover 200 by the knob means 400 to allow the sliding of the upper cover 300, and an interlock 600 disposed at the upper cover 300 and rotating the hook 210 corresponding to an operation of the knob means 400 at the protruding position of the upper cover 300, to detach the hook 210 from the console.

Although not illustrated, the lower cover 200 is rotatably fastened to the console of the vehicle and opens or closes an upper portion of the console.

Further, the hook 210 is rotatably fastened to the lower cover 200. The hook 210 is hooked and fastened to the console and keeps a state in which the lower cover 200 closes the console. Further, when the knob means 400 is operated to rotate the hook 210, the hook 210 is released to rotate the lower cover 200 so that the lower cover 200 opens the console. Here, an elastic member 211 is provided at the hook 210 to apply elastic force so that the hook 210 rotates in a direction in which the hook 210 is hooked and fastened to the console.

Further, the lower cover 200 includes a first hole 221 into which an end 532 of a second link 530 of the stopper 500 is inserted at the initial position of the upper cover 300 before being slid, and a second hole 222 into which the end 532 of the second link 530 of the stopper 500 is inserted at the protruding position of the upper cover 300 after being slid in a protruding direction.

Accordingly, when the upper cover 300 is positioned at the initial position or the protruding position, the end 532 of the second link 530 of the stopper 500 is inserted into the first hole 221 or the second hole 222 of the lower cover 200 to restrain the sliding of the upper cover 300.

The upper cover 300 is disposed above the lower cover 200 and slid between the initial position thereof before being slid and the protruding position thereof after being slid to protrude in the length direction.

Although not illustrated, a rail (not illustrated) may be provided between the upper cover 300 and the lower cover 200 to guide the sliding of the upper cover 300.

The knob means 400 is rotatably provided at the upper cover 300, and rotates the hook 210 to detach the hook 210 from the console. That is, when a user rotates the knob means 400 by pressurizing the knob means 400 to open the console, the knob means 400 rotates the hook 210 so that the hook 210 is detached from the console.

More specifically, the knob means 400 includes a rotating shaft 410 rotatably fastened to the upper cover 300, a knob 420 protruding from one side of the rotating shaft 410 toward outside of the upper cover 300 and operated by the user, and a moving part 430 protruding from the other side of the rotating shaft 410 to be disposed at an inner side of the upper cover 300 and having an end 431 rotatably fastened to the stopper 500 and a protrusion 432 protruding downward and operating the hook 210.

That is, in the knob means 400, the knob 420 and the moving part 430 are formed to extend from opposing sides of the rotating shaft 410 rotatably fastened to the upper cover 300, and when the user rotates the knob 420 upward by pressurizing the knob 420, the moving part 430 rotates downward.

At this point, the protrusion 432 of the moving part 430 moves downward to pressurize the hook 210, thereby rotating the hook 210 to be detached from the console. Further, the end 431 of the moving part 430 rotates downward to operate the stopper 500 so that the stopper 500 is detached from the lower cover 200.

In addition, the knob means 400 further includes an elastic member 440 disposed at the rotating shaft 410 and having one end fastened to the moving part 430 and the other end fastened to the upper cover 300 to apply elastic force so that the knob 420 rotates downward.

That is, since the elastic member 440 rotates the knob 420 to be in an initial position when the user does not pressurize the knob 420, the moving part 430 is spaced apart from the hook 210 and the stopper 500 so that the hook 210 and the stopper 500 return to initial positions, that is, a position where the hook 210 is fastened to the console and a position where the stopper 500 is fastened to the lower cover 200, respectively.

The stopper 500 is disposed at the upper cover 300, and fastened to the lower cover 200 to restrain the sliding of the upper cover 300 or released from the lower cover 200 corresponding to the operation of the knob means 400 to allow the sliding of the upper cover 300.

More specifically, the stopper 500 includes a rotating shaft 510 rotatably fastened to the upper cover 300, a first link 520 protruding from one side of the rotating shaft 510 to be rotatably fastened to the end 431 of the moving part 430, and the second link 530 protruding from the other side of the rotating shaft 510 and having an end 532 bent to be selectively inserted into any one of the first hole 221 and the second hole 222 formed in the lower cover 200.

That is, since the first link 520 of the stopper 500 is rotatably fastened to the moving part 430 of the knob means 400, when the moving part 430 rotates, the stopper 500 rotates together corresponding thereto, and when the first link 520 rotates downward, the end 532 of the second link 530 rotates upward to be separated from the holes 221 and 222 of the lower cover 200.

By the configuration as described above, when the user rotates the knob 420 of the knob means 400 upward by pressurizing the knob 420, the end 431 of the moving part 430 of the knob means 400 rotates the first link 520 of the stopper 500 downward to rotate the second link 530 of the stopper 500 upward, such that the end 532 of the second link 530 is separated from the lower cover 200, thereby sliding the upper cover 300.

The interlock 600 is disposed at the upper cover 300, and rotates the hook 210 corresponding to the operation of the knob means 400 at the protruding position of the upper cover 300 to detach the hook 210 from the console.

That is, the interlock 600 is operated to rotate the hook 210 when the user rotates the knob 420 of the knob means 400 upward by pressurizing the knob 420, even in a state in which the upper cover 300 is slid to protrude.

More specifically, the interlock 600 includes a rotating shaft 610 rotatably fastened to the upper cover 300 to be positioned above the stopper 500, a first member 620 protruding from one side of the rotating shaft 610 to contact the second link 530 of the stopper 500, and a second member 630 protruding from the other side of the rotating shaft 610 and having an end 631 bent to be inserted into a through hole 531 formed in the second link 530 of the stopper 500 thereby selectively rotating the hook 210.

That is, the interlock 600 is operated in a manner that when the second link 530 of the stopper 500 rotates upward, the first member 620 rotates upward together therewith and the second member 630 rotates downward so that the end 631 of the second member 630 rotates the hook 210 through the through hole 531 formed in the second link 530 of the stopper 500, thereby detaching the hook 210 from the console.

By the configuration as described above, the interlock 600 may operate the hook 210 when the user operates the knob 420, even in a state in which the upper cover 300 is slid to protrude, thereby easily opening the console.

According to the sliding armrest for a vehicle according to the present invention, the armrest may be selectively slid by including the stopper operated corresponding to the operation of the knob, thereby providing convenience and safety to a user.

Further, according to the present invention, since the console may be opened by operating the knob in a state in which the armrest is slid, thereby providing convenience to a user.

As described above, although the present invention has been described with reference to exemplary embodiments and the accompanying drawings, it would be appreciated by those skilled in the art that the present invention is not limited thereto but various modifications and alterations might be made without departing from the scope defined in the following claims.

What is claimed is:
1. A sliding armrest for a vehicle, comprising:
 a lower cover having a rotatable hook that is detachably coupled to a console and opening and closing a storage space of the console;
 an upper cover disposed above the lower cover and slid between a protruding position in a length direction and an initial position;
 a knob means rotatably provided at the upper cover and rotating the hook at the initial position of the upper cover to detach the hook from the console;
 a stopper disposed at the upper cover, and fastened to the lower cover to restrain sliding of the upper cover or released from the lower cover by the knob means to allow the sliding of the upper cover; and
 an interlock disposed at the upper cover and rotating the hook corresponding to an operation of the knob means at the protruding position of the upper cover, to detach the hook from the console.

2. The sliding armrest for a vehicle of claim 1, wherein the knob means includes a rotating shaft rotatably fastened to the upper cover, a knob protruding from one side of the rotating shaft toward outside of the upper cover and operated by a user, and a moving part protruding from the other side of the rotating shaft to be disposed at an inner side of the upper cover and having an end rotatably fastened to the stopper and a protrusion protruding downward and operating the hook.

3. The sliding armrest for a vehicle of claim 2, wherein the knob means further includes an elastic member disposed at the rotating shaft and having one end fastened to the moving part and the other end fastened to the upper cover to apply elastic force so that the knob rotates downward.

4. The sliding armrest for a vehicle of claim 1, wherein the stopper includes a rotating shaft rotatably fastened to the upper cover, a first link protruding from one side of the rotating shaft to be rotatably fastened to the knob means, and a second link protruding from the other side of the rotating shaft and having an end bent to be selectively inserted into a hole formed in the lower cover.

5. The sliding armrest for a vehicle of claim 4, wherein the first link of the stopper rotates by an operation of the knob means, and when the first link rotates downward, the end of the second link rotates upward to be separated from the hole of the lower cover.

6. The sliding armrest for a vehicle of claim 4, wherein the lower cover includes a first hole into which the end of the second link of the stopper is inserted at the initial position of the upper cover, and a second hole into which the end of the second link of the stopper is inserted at the protruding position of the upper cover.

7. The sliding armrest for a vehicle of claim 1, wherein the interlock includes a rotating shaft rotatably fastened to the upper cover to be positioned above the stopper, a first member protruding from one side of the rotating shaft to contact a second link of the stopper, and a second member protruding from the other side of the rotating shaft and having an end bent to be inserted into a through hole formed in the second link of the stopper to selectively rotate the hook.

8. The sliding armrest for a vehicle of claim 7, wherein in the interlock, when the second link of the stopper rotates upward, the first member rotates upward together therewith and the second member rotates downward so that the end of the second member rotates the hook to detach the hook from the console.

* * * * *